United States Patent
Qi et al.

(10) Patent No.: US 10,006,150 B2
(45) Date of Patent: Jun. 26, 2018

(54) HYDROPHOBIC FLAME-RETARDANT FIBER AND A PREPARATION METHOD THEREOF

(71) Applicant: BOSIDENG CORPORATION LIMITED, Changshu (CN)

(72) Inventors: Lu Qi, Tianjin (CN); Zhijia Ding, Changshu (CN); Dekang Gao, Changshu (CN); Xiadong Gao, Changshu (CN)

(73) Assignee: Bosideng Corporation Limited, Changshu (CN)

( * ) Notice: Subject to any disclaimer, the term of this patent is extended or adjusted under 35 U.S.C. 154(b) by 651 days.

(21) Appl. No.: 14/560,653

(22) Filed: Dec. 4, 2014

(65) Prior Publication Data

US 2015/0087756 A1    Mar. 26, 2015

Related U.S. Application Data

(63) Continuation of application No. PCT/CN2013/000589, filed on May 20, 2013.

(30) Foreign Application Priority Data

Aug. 1, 2012    (CN) .......................... 2012 1 0270770

(51) Int. Cl.
*D01F 6/62* (2006.01)
*D01D 5/34* (2006.01)
*D01F 1/07* (2006.01)
*D01F 1/10* (2006.01)
*D01F 8/10* (2006.01)
*D01F 8/14* (2006.01)
*D01G 13/00* (2006.01)
*C08J 3/22* (2006.01)

(52) U.S. Cl.
CPC ............... *D01F 6/62* (2013.01); *C08J 3/226* (2013.01); *D01D 5/34* (2013.01); *D01F 1/07* (2013.01); *D01F 1/10* (2013.01); *D01F 8/10* (2013.01); *D01F 8/14* (2013.01); *D01G 13/00* (2013.01); *C08J 2367/02* (2013.01); *C08J 2427/06* (2013.01); *C08J 2467/02* (2013.01); *D10B 2321/02* (2013.01); *D10B 2321/042* (2013.01); *D10B 2331/04* (2013.01); *D10B 2401/021* (2013.01)

(58) Field of Classification Search
CPC .......... D10B 2321/02; D10B 2321/042; D10B 2331/04; D10B 2401/021; D01F 8/10; D01F 8/14; D01F 8/16; D01F 6/62; D01F 1/07; D01F 1/10; D01D 5/34
See application file for complete search history.

(56) References Cited

PUBLICATIONS

DuPont.™ Fusabond® Functional Polymer product information sheet Oct. 2017 (Year: 2017).*
Shenoy et al. (Melt Flow Index: More than just a quality control rheological parameter. Part I, Advances in Polymer Technology, vol. 6, No. 1, 1-58, Jan. 1986) (Year: 1986).*
Tcchemicals, Titanate Coupling Agent product information sheet, Oct. 2017 (http://www.tcchem.com.cn/titanate-coupling-agent/titanate-coupling-agent-tc-f-cas-61417-49-0-kr-tts) . (Year: 2017).*
English machine translation of CN 101205639, China, Jun. 2008, pp. 1-2 (Year: 2008).*
English machine translation of CN 1668695, China, Sep. 2005, pp. 1-18 (Year: 2005).*
Written Opinion of the International Searching Authority, PCT/CN2013/000589, pp. 1-8. dated Aug. 2013.*

* cited by examiner

Primary Examiner — Holly Rickman
(74) Attorney, Agent, or Firm — Zareefa B. Flener; Flener IP & Business Law

(57) ABSTRACT

A kind of hydrophobic flame-retardant fiber and a preparation method thereof are provided by the present invention. The fiber has a skin-core structure, wherein, the volume ratio of skin to core is in a range of 2:8-6:4; weight percentages of compositions of skin layer material include: 79.9%-88.8% of PET (polyethylene terephthalate), 8%-13% of PVDF (polyvinylidene fluoride), 3%-6% of flame-retardant agent, 0.1%-0.5% of compatibilizer, 0.1%-0.6% of coupling agent; weight percentages of compositions of core layer material include: 91%-95% of PET, 5%-9% of flame-retardant agent.

10 Claims, No Drawings

HYDROPHOBIC FLAME-RETARDANT FIBER AND A PREPARATION METHOD THEREOF

CROSS-REFERENCE TO RELATED APPLICATION

The application is a continuation of PCT/CN2013/000589 (filed on May 20, 2013), which claims priority from CN Patent Application Serial No. 201210270770.9 (filed on Aug. 1, 2012), the entire contents of which are incorporated herein by reference for all purposes.

FIELD OF THE INVENTION

The present invention is related to functional chemical fiber technology, especially related to a kind of hydrophobic flame-retardant fiber and a preparation method thereof.

BACKGROUND OF THE INVENTION

Hydrophobic flame-retardant fiber is a kind of functional fiber having hydrophobic and flame-retardant functions. Several kinds of hydrophobic flame-retardant fiber are disclosed in the prior art, however, the hydrophobic and flame-retardant functions of these kinds of fiber are unsatisfactory.

For example, a Chinese patent CN101143923 discloses a kind of water-repellent polyester fiber which is used for waterproof cloth. The preparation method of the water-repellent polyester fiber includes: preparing water-repellent polyester by adding B type additive silicone or dimer acid during the polymer shiny forming process of purified p-phthalic acid and ethylene glycol, and then spinning the water-repellent polyester into water-repellent fiber with a square section by using a spinneret having a square spinning hole. However, this kind of fiber is not flame-retardant.

Another Chinese Patent CN102337667A discloses a flame-retardant and water-repellent textile containing flame-retardant polyester fiber and a preparation method thereof. Wherein, weight content of bromine is ≤5 µg/g and weight content of fluoride content is ≤5 µg/g. However, this kind of textile is prepared through a functional finishing process by using non-halogen flame-retardant agent and non-fluorine water-repellent agent; so that hand feeling is not comfortable, and functional finishing agent on it is easily to be washed off Patent CN101787579A discloses a kind of flame-retardant polyester fiber, a preparation method and an apparatus thereof. The flame-retardant polyester fiber is consisted by an internal layer and a outer layer. The internal layer material includes flame-retardant PET resin and the outer layer material is PET resin. However, as the outer layer material is a kind of regular polyester, this kind of flame-retardant polyester fiber is not hydrophobic; and as the flame-retardant agent is in the internal layer, the flame-retardant function is reduced.

SUMMARY OF THE INVENTION

Therefore, a hydrophobic flame-retardant fiber and a preparation method thereof are provided by the present invention. The fiber has both of good hydrophobic and flame-retardant functions, and also has washing resistance and increased performance time. The hand feeling is comfortable so that the fiber is suitable to be weaved into clothes. The preparation method of the fiber includes a skin-core composite spinning process, which can make hydrophobic and flame-retardant property mutually complemented or strengthen, and the manufacturing process is easy and suitable to be industrialized.

According to an embodiment of the present invention, a hydrophobic flame-retardant fiber is provided, which has a skin-core structure, wherein, the volume ratio of skin to core is in a range of 2:8-6:4;

wherein, weight percentages of compositions of skin layer material comprise: 79.9%-88.8% of PET (polyethylene terephthalate), 8%-13% of PVDF (polyvinylidene fluoride), 3%-6% of flame-retardant agent, 0.1%-0.5% of compatibilizer, 0.1%-0.6% of coupling agent;

wherein, weight percentages of compositions of core layer material comprise: 91%-95% of PET, 5%-9% of flame-retardant agent.

According to an embodiment of the present invention, a preparation method of a kind of hydrophobic flame-retardant fiber provided includes:

(1) preparing flame-retardant chips;
(2) preparing the skin layer material;
(3) preparing the core layer material;
(4) using the skin layer material (1) and the core layer material (2) to form undrawn yarn, then drawing the undrawn yarn by a skin-core composite spinning machine to obtain the hydrophobic flame-retardant fiber.

The hydrophobic flame-retardant fiber provided by the present invention has both of good hydrophobic performance and good flame-retardant performance. PVDF and flame-retardant agent included in the skin layer can make the hydrophobic flame-retardant fiber flame-retardant and permanent hydrophobic; flame-retardant agent included in the core layer can make hydrophobic flame-retardant fiber permanent flame-retardant. Besides, the hydrophobic flame-retardant fiber provided by the present invention is spinned after mixing or melting various materials and polymers, so that washing resistance and hand feeling are better than coated fiber, and the fiber is more suitable to be weaved into clothes. As using the preparation method provided by embodiments of the present invention, two kinds of materials with different performances are spanned into a skin-core structure, so that the hydrophobic flame-retardant fiber is both hydrophobic and flame-retardant, and the two properties are non-interfered and mutually complemented. Moreover, the composite spinning technology used is easy to be industrialized and the manufacturing cost is low.

DETAILED DESCRIPTION OF THE INVENTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

Further, the order of the steps in the present embodiment is exemplary and is not intended to be a limitation on the embodiments of the present invention. It is contemplated that the present invention includes the process being practiced in other orders and/or with intermediary steps and/or processes.

In an embodiment of the present invention, a hydrophobic flame-retardant fiber provided has a skin-core structure, wherein, the volume ratio of skin to core is in a range of 2:8-6:4. Specifically, weight percentages of compositions of the skin layer material include: 79.9%-88.8% of PET (polyethylene terephthalate), 8%-13% of PVDF (polyvinylidene fluoride), 3%-6% of flame-retardant agent, 0.1%-0.5% of compatibilizer, 0.1%-0.6% of coupling agent; weight percentages of compositions of the core layer material include: 91%-95% of PET, 5%-9% of flame-retardant agent.

The PET in the skin layer material is regular polyethylene glycol terephthalate, which is the same with that in the core layer material. The melt index (MI) of the PVDF in the skin layer material is in 18-45.

The flame-retardant agent in the skin layer material may be selected from polysulfonydipheylene phenylephosphoate, aryl polyphosphate, poly-p-phenylene phenylphosphate and poly(p-diphenyl sulfone phenylphosphate).

The compatibilizer in the skin layer material may be selected from acrylate grafted polyolefin elastomer and malefic anhydride grafted polyolefin elastomer.

The coupling agent is a 1:1 mixture of paraffin and any one selected from isopropyl triisostearoyltitanate, tris(dodecylbenzenesulfonato) tetraisopropyl titanate, isopropyl tri (dioctylphosphato) titanate and isopropyl tri (dioctylpyrophosphato) titanate.

The flame-retardant agent in the core layer material may be any one of polysulfonydipheylene phenylephosphoate, aryl polyphosphate, poly-p-phenylene phenylphosphate and poly(p-diphenyl sulfone phenylphosphate).

A preparation method of the hydrophobic flame-retardant fiber is provided by an embodiment of the present invention. With the weight percentages of compositions provided by embodiments of the present invention, the method includes following processes:

(1) Flame-retardant chips are prepared. Specifically, the flame-retardant agent and a part of dried PET in the compositions of the skin layer material are thoroughly mixed to obtain a mixture, and the mixture is squeezed out and granulated by a double screw extruder at a temperature in 255° C.-260 to obtain the flame-retardant chips. The weight percentage of the flame-retardant agent in the flame-retardant chips is 6%-9%.

(2) Skin layer material is prepared. Specifically, the PVDF in the compositions of the skin layer material, the prepared flame-retardant chips and the remaining part of PET (which was remained after preparing the flame-retardant chips) are dried, and then are thoroughly mixed with the compatibilizer and the coupling agent according to the weight percentages of compositions in the skin layer material to obtain a mixture. The mixture is squeezed out and granulated by a double screw extruder at a temperature in 255° C.-260° C. to obtain the skin layer material.

In the technical scheme of the present invention, the flame-retardant chips are prepared via fusion and granulation process using the mixture of flame-retardant agent and a part of dried PET in the compositions of the skin layer material, and the weight percentage of the flame-retardant in the flame-retardant chips is 6%-9%. The remaining part of PET is dried and used for preparing the skin layer material. The two parts of PET constitutes the composition of PET in the skin layer material. In order to mix more uniformly, the flame-retardant chips are prepared in advance and then mixed with other materials.

(3) Core layer material is prepared. Specifically, the PET and the flame-retardant agent are thoroughly mixed with reference to the weight percentages of compositions in the core layer material to obtain a mixture, and then the mixture is squeezed out and granulated by a double screw extruder at a temperature in 255° C. -260° C. to obtain the core layer material.

(4) A hydrophobic flame-retardant fiber with a skin-core structure is prepared. Specifically the skin layer material prepared in step (2) and the core layer material prepared in step (3) are winded at a volume ratio of 2:8-6:4 to form undrawn yarn. Then the undrawn yarn is drawn by a skin-core composite spinning machine to obtain the hydrophobic flame-retardant fiber.

The volume ratio of skin to core may affect the flame-retardant performance of the fiber. At high volume ratio of skin to core, the flame-retardant function of the core layer material cannot perform obviously; and at low volume ratio of skin to core, the hydrophobic function may be affected. Therefore, the volume ratio of skin to core is required to be controlled in the described range, and the preferred volume ratio is in a range of 3:7-5:5. The drawing process of the fiber may be a conventional drawing process or a regular drawing process, and the length of the fiber is drawn to 3-5 times. After a testing process, the hydrophobic angle of the fiber is in 86-90 and the limiting oxygen index of the fiber is in 27-29. So the fiber is named as hydrophobic flame-retardant fiber. The strength index and other physical index of the fiber also meet the requirements of regular fiber.

In an embodiment of the present invention, the hydrophobic flame-retardant fiber is prepared by following processes.

60.7 kg of dried PET and 6 kg of polysulfonydipheylene phenylephosphoate are thoroughly mixed to obtain a mixture, and the mixture is squeezed out and granulated by a double screw extruder at a temperature of 255° C. to obtain 66.7 kg of flame-retardant chips.

19.2 kg of dried PET, 13 kg of PVDF(whose MI is 45), 66.7 kg of dried flame-retardant chips, 0.5 kg of acrylate grafted polyolefin elastomer, 0.3 kg of isopropyl triisostearoyltitanate and 0.3 kg of paraffin are thoroughly mixed to obtain a mixture, and the mixture is squeezed out and granulated by a double screw extruder at a temperature of 255° C. to obtain skin layer material.

91 kg of dried PET and 9 kg of polysulfonydipheylene phenylephosphoate are thoroughly mixed to obtain a mixture, and the mixture is squeezed out and granulated by a double screw extruder at a temperature of 260° C. to obtain core layer material.

Finally, the skin layer material and the core layer material are winded at a volume ratio of 2:8 to form undrawn yarn by a skin-core composite spinning machine, and the length of the undrawn yarn is drawn to 3 times at a temperature of 120° C. to obtain hydrophobic flame-retardant fiber.

It is tested that the hydrophobic angle of the fiber is 90 and the limiting oxygen index of the fiber is 29.

In another embodiment of the present invention, the hydrophobic flame-retardant fiber is prepared by following processes.

47 kg of dried PET and 3 kg of aryl polyphosphate are thoroughly mixed to obtain a mixture, and the mixture is squeezed out and granulated by a double screw extruder at a temperature of 260° C. to obtain 50 kg of flame-retardant chips.

41.8 kg of dried PET, 8 kg of PVDF (whose MI is 18), 50 kg of dried flame-retardant chips, 0.1 kg of malefic anhydride grafted polyolefin elastomer, 0.05 kg of tris(dodecylbenzenesulfonato) tetraisopropyl titanate and 0.05 kg of paraffin are thoroughly mixed to obtain a mixture, and the mixture is squeezed out and granulated by a double screw extruder at a temperature of 260° C. to obtain skin layer material.

95 kg of dried PET and 5 kg of aryl polyphosphate are thoroughly mixed to obtain a mixture, and the mixture is squeezed out and granulated by a double screw extruder at a temperature of 265° C. to obtain core layer material.

Finally, the skin layer material and the core layer material are winded at a volume ratio of 6:4 to form undrawn yarn by a skin-core composite spinning machine, and the length of the undrawn yarn is drawn to 3.5 times at a temperature of 120° C. to obtain hydrophobic flame-retardant fiber.

In this embodiment, the hydrophobic angle of the fiber is 86 and the limiting oxygen index is 27.

In another embodiment of the present invention, the hydrophobic flame-retardant fiber is prepared by following processes.

57.5 kg of dried PET and 5 kg of poly-p-phenylene phenylphosphate are thoroughly mixed to obtain a mixture, and the mixture is squeezed out and granulated by a double screw extruder at a temperature of 255° C. to obtain 62.5 kg of flame-retardant chips.

24.6 kg of dried PET, 12 kg of PVDF (whose MI is 35), 62.5 kg of dried flame-retardant chips, 0.4 kg of acrylate grafted polyolefin elastomer, 0.25 kg of isopropyl tri (dioctylphosphato) titanate and 0.25 kg of paraffin are thoroughly mixed to obtain a mixture, and the mixture is squeezed out and granulated by a double screw extruder at a temperature of 255° C. to obtain skin layer material.

92 kg of dried PET and 8 kg of polysulfonydipheylene phenylephosphoate are thoroughly mixed to obtain a mixture, and the mixture is squeezed out and granulated by a double screw extruder at a temperature of 260° C. to obtain core layer material.

Finally, the skin layer material and the core layer material are winded at a volume ratio of 3:7 to form undrawn yarn by a skin-core composite spinning machine, and the length of the undrawn yarn is drawn to 4 times at a temperature of 120° C. to obtain hydrophobic flame-retardant fiber.

In this embodiment, the hydrophobic angle of the fiber is 89 and the limiting oxygen index of the fiber is 29.

In another embodiment of the present invention, the hydrophobic flame-retardant fiber is prepared by following processes.

53.2 kg of dried PET and 4 kg of poly(p-diphenyl sulfone phenylphosphate) are thoroughly mixed to obtain a mixture, and the mixture is squeezed out and granulated by a double screw extruder at a temperature of 255° C. to obtain 57.2 kg of flame-retardant chips.

32.1 kg of dried PET, 10 kg of PVDF (whose MI is 30), 57.2 kg of dried flame-retardant chips, 0.3 kg of malefic anhydride grafted polyolefin elastomer, 0.2 kg of isopropyl tri(dioctylpyrophosphato) titanate and 0.2 kg of paraffin are thoroughly mixed to obtain a mixture, and the mixture is squeezed out and granulated by a double screw extruder at a temperature of 255° C. to obtain skin layer material.

91 kg of dried PET and 9 kg of polysulfonydipheylene phenylephosphoate are thoroughly mixed to obtain a mixture, and the mixture is squeezed out and granulated by a double screw extruder at a temperature of 265° C. to obtain core layer material.

Finally, the skin layer material and the core layer material are winded at a volume ratio of 4:6 to form undrawn yarn by a skin-core composite spinning machine, and the length of the undrawn yarn is drawn to 4.5 times at a temperature of 120° C. to obtain hydrophobic flame-retardant fiber.

In this embodiment, the hydrophobic angle of the fiber is 88 and the limiting oxygen index of the fiber is 28.

In another embodiment of the present invention, the hydrophobic flame-retardant fiber is prepared by following processes.

62.7 kg of dried PET and 4 kg of poly(p-diphenyl sulfone phenylphosphate) are thoroughly mixed to obtain a mixture, and the mixture is squeezed out and granulated by a double screw extruder at a temperature of 260° C. to obtain 66.7 kg of flame-retardant chips.

23.8 kg of dried PET, 9 kg of PVDF (whose MI is 25), 66.7 kg of dried flame-retardant chips, 0.2 kg of acrylate grafted polyolefin elastomer, 0.15 kg of isopropyl triisosteaoryltitanate and 0.15 kg of paraffin are thoroughly mixed to obtain a mixture, and the mixture is squeezed out and granulated by a double screw extruder at a temperature of 255° C. to obtain skin layer material.

92 kg of dried PET and 8 kg of polysulfonydipheylene phenylephosphoate are thoroughly mixed to obtain a mixture, and the mixture is squeezed out and granulated by a double screw extruder at a temperature of 265° C. to obtain core layer material.

Finally, the skin layer material and the core layer material are winded at a volume ratio of 5:5 to form undrawn yarn by a skin-core composite spinning machine, and the length of the undrawn yarn is drawn to 5 times at a temperature of 120° C. to obtain hydrophobic flame-retardant fiber.

In this embodiment, the hydrophobic angle of the fiber is 87 and the limiting oxygen index of the fiber is 28.

The above embodiments are only preferred embodiments of the present invention and cannot be used to limit the protection scope of the present invention. Those skilled in the art can understand that, the technical scheme of the embodiment may still be modified or partly equivalently substituted; and the modification or substitution should be considered within the spirit and protection scope of the present invention.

The invention claimed is:

1. A hydrophobic flame-retardant fiber with a skin-core structure, wherein, the volume ratio of skin to core is in a range of 2:8-6:4;
    wherein, weight percentages of compositions of skin layer material comprise: 79.9%-88.8% of PET, 8%-13% of PVDF, 3%-6% of flame-retardant agent, 0.1%-0.5% of compatibilizer, 0.1%-0.6% of coupling agent;
    wherein, weight percentages of compositions of core layer material comprise: 91%-95% of PET, 5%-9% of flame-retardant agent.

2. The hydrophobic flame-retardant fiber of claim 1, wherein, melt index of the PVDF is in 18-45.

3. The hydrophobic flame-retardant fiber of claim 1, wherein, the compatibilizer is selected from acrylate grafted polyolefin elastomer and a malefic anhydride grafted polyolefin elastomer.

4. The hydrophobic flame-retardant fiber of claim 1, wherein, the coupling agent is a 1:1 mixture of paraffin and any one selected from isopropyl triisostearoyltitanate, tris (dodecylbenzenesulfonato) tetraisopropyl titanate, isopropyl tri (dioctylphosphato) titanate and isopropyl tri (dioctylpyrophosphato) titanate by weight percentage.

5. The hydrophobic flame-retardant fiber of claim 1, wherein, the flame-retardant agent in the skin layer material and in the core layer material is independently selected from polysulfonyldiphenylene phenylphosphoate, aryl polyphosphate, poly-p-phenylene phenylphosphate and poly (p-diphenyl sulfone phenylphosphate).

6. The hydrophobic flame-retardant fiber of claim 1, wherein, the volume ratio of skin to core is in a range of 3:7-5:5.

7. A preparation method of a hydrophobic flame-retardant fiber, comprising:
    preparing flame-retardant chips;
    preparing the skin layer material, wherein, weight percentages of compositions of skin layer material comprise: 79.9%-88.8% of PET, 8%-13% of PVDF, 3%-6% of flame-retardant agent, 0.1%-0.5% of compatibilizer, 0.1%-0.6% of coupling agent;
    preparing the core layer material, wherein, weight percentages of compositions of core layer material comprise: 91%-95% of PET, 5%-9% of flame-retardant agent;
    using the skin layer material and the core layer material to form undrawn yarn, and drawing the undrawn yarn by a skin-core composite spinning machine to obtain the hydrophobic flame-retardant fiber.

8. The preparation method of claim 7, wherein, preparing flame-retardant chips comprises:
    mixing flame-retardant agent and a part of dried PET in the compositions of the skin layer material to obtain a mixture;
    squeezing out and granulating the mixture by a double screw extruder at a temperature in 255° C.-260° C. to prepare the flame-retardant chips; wherein, the weight percentage of the flame-retardant agent in the flame-retardant chips is 6%-9%.

9. The preparation method of claim 8, wherein, preparing the skin layer material comprises:
    drying the PVDF in the compositions of the skin layer material, the prepared flame-retardant chips and the remaining PET in the compositions of the skin layer material;
    mixing the PVDF, the prepared flame-retardant chips and the remaining PET with compatibilizer and coupling agent to obtain a mixture;
    squeezing out and granulating the mixture by a double screw extruder at a temperature in 255° C.-260° C. to obtain the skin layer material.

10. The preparation method of claim 7, wherein, preparing the core layer material comprises:
    mixing the PET and the flame-retardant agent to obtain a mixture;
    squeezing out and granulating the mixture by a double screw extruder at a temperature in 255° C.-260° C. to obtain the core layer material.

* * * * *